United States Patent [19]

Griffith

[11] Patent Number: 4,930,988
[45] Date of Patent: Jun. 5, 1990

[54] INDIVIDUAL BLADE CONTROL SYSTEM FOR HELICOPTERS

[76] Inventor: Carl D. Griffith, 9114 Luna Del Oro NE., Albuquerque, N. Mex. 87111

[21] Appl. No.: 305,034

[22] Filed: Jan. 2, 1989

[51] Int. Cl.$^5$ ............................................. B64C 27/74
[52] U.S. Cl. ....................................... 416/114; 416/31
[58] Field of Search .................................. 416/31, 114

[56] References Cited
U.S. PATENT DOCUMENTS

| | | | |
|---|---|---|---|
| 2,439,089 | 4/1948 | Hodson | 416/114 |
| 2,546,881 | 3/1951 | Avery | 416/114 |
| 3,144,908 | 8/1964 | Pascher | 416/114 |
| 3,148,733 | 9/1964 | Drees et al. | 416/114 |
| 3,504,989 | 4/1970 | Kisovec | 416/114 |
| 3,508,841 | 4/1970 | Derschmidt | 416/114 |
| 3,525,576 | 8/1970 | Dorand | 416/114 |
| 3,799,695 | 3/1974 | Yamakawa | 416/114 |
| 4,127,245 | 11/1978 | Tefft et al. | 416/31 |
| 4,227,856 | 10/1980 | Verrill et al. | 416/114 |
| 4,243,358 | 1/1981 | Carlock et al. | 416/31 |

Primary Examiner—Everette A. Powell, Jr.
Attorney, Agent, or Firm—Arnold L. Albin

[57] ABSTRACT

A control system for providing individual blade control inputs to a four-bladed helicopter rotor. Limited authority series actuators located in a non-rotating portion of the helicopter are driven by a computer which receives inputs from individual blade sensors and aircraft stabilization sensors, summed with cockpit control inputs, and the resultant motions transmitted to the rotor blades through a conventional swashplate which drives four blades of the rotor and a translatable differential sleeve and summing linkage which drives only two blades. The differential sleeve is adapted for axially raising or lowering the swashplate. The combined motion of swashplate and differential sleeve is shown mathematically to result in individual blade control in pitch. Computer individual blade commands are converted from the rotating reference frame to cyclic, collective and differential blade pitch commands in the fixed reference frame through a coordinate transformation matrix.

13 Claims, 2 Drawing Sheets

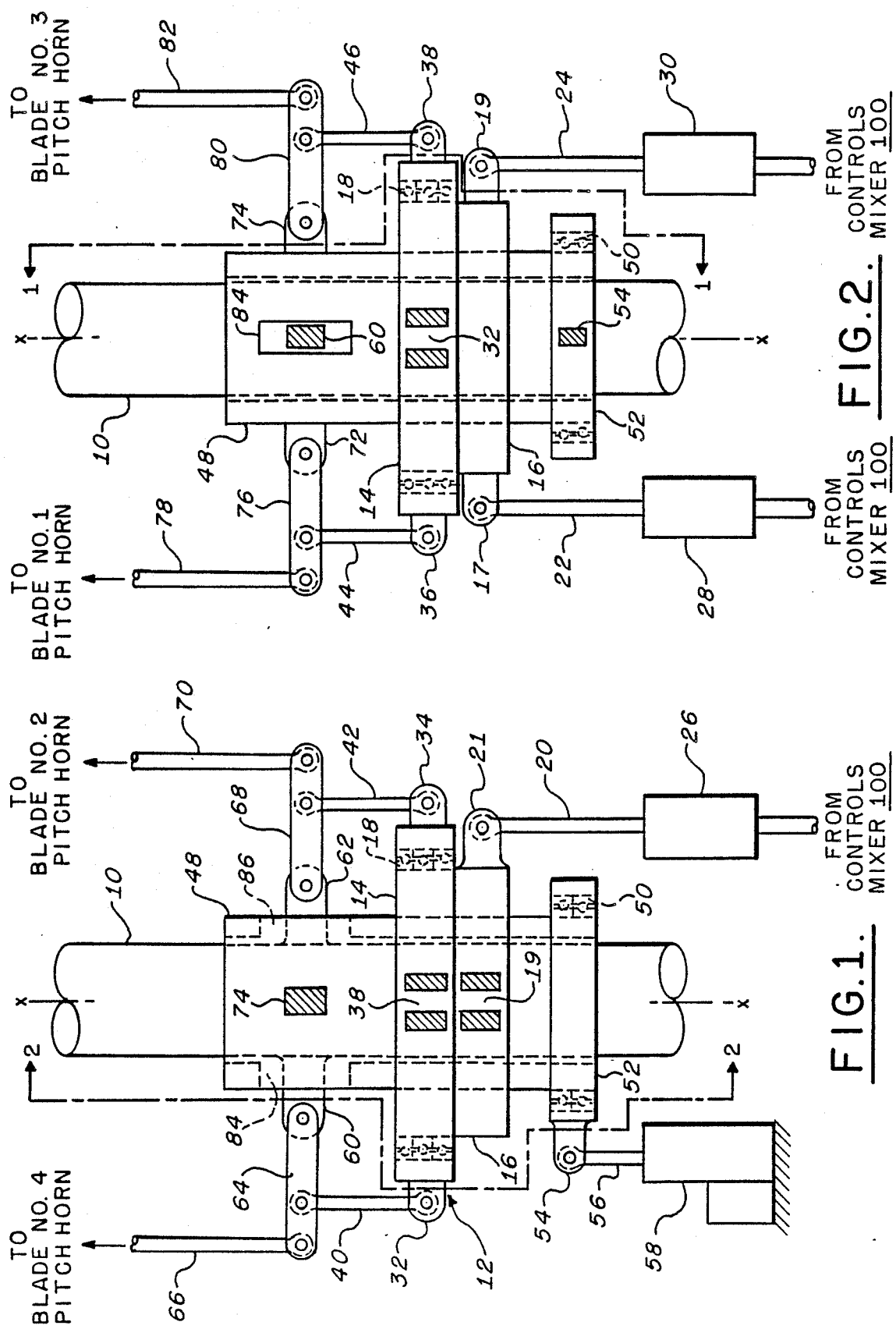

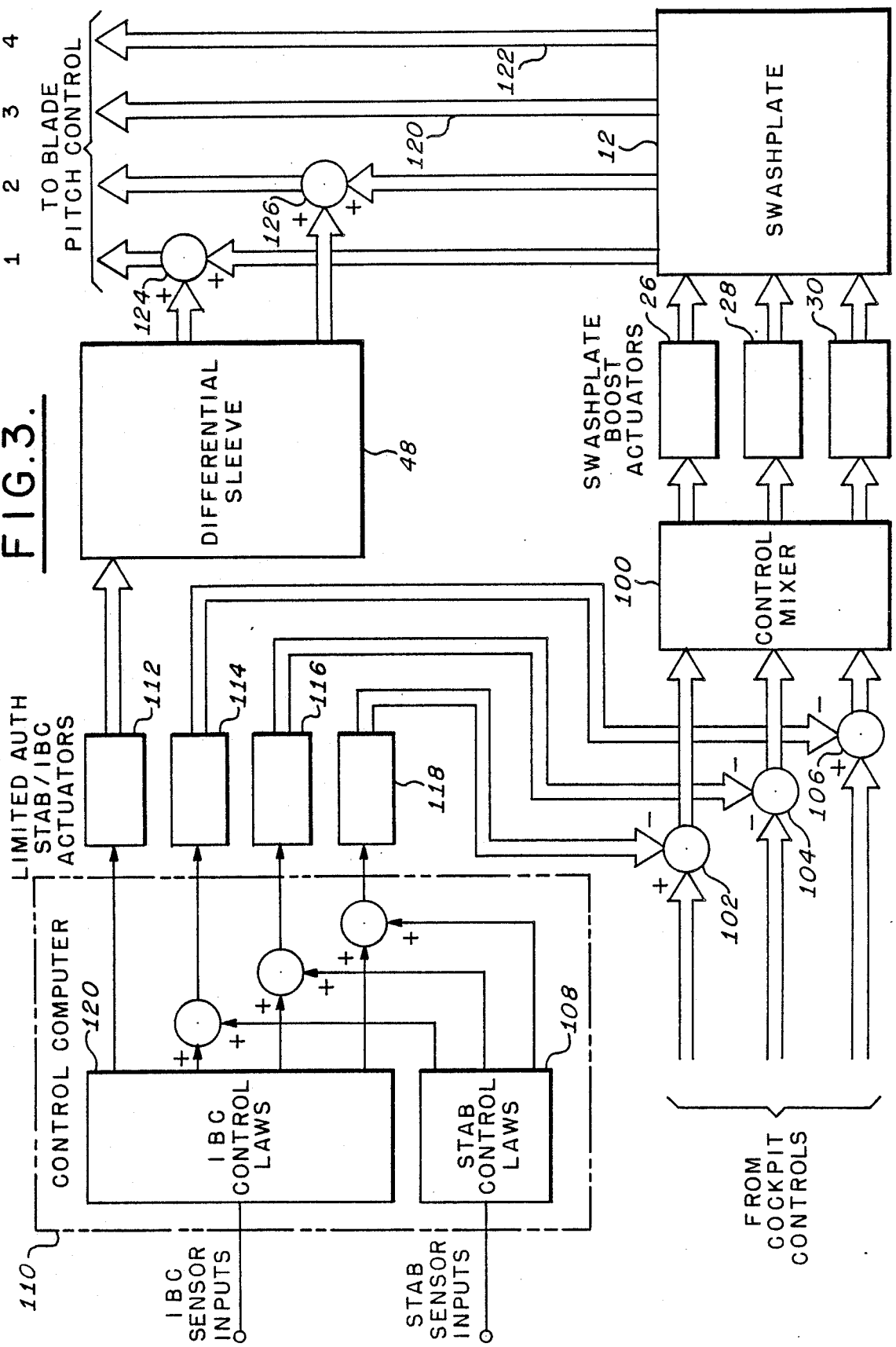

INDIVIDUAL BLADE CONTROL SYSTEM FOR HELICOPTERS

BACKGROUND OF THE INVENTION

1. Field of the Invention

The invention relates to helicopters and more particularly to a system for individually controlling the pitch angles of a four-blade rotor.

2. Description of the Prior Art

A helicopter is supported by a rotor having a plurality of articulated blades, free for up and down motion (flapping), lead and lag (in the plane of motion), and along the axis of the blade (pitch or feathering). The horizontal motion of the craft is controlled by tilting the plane of the rotor, which in turn results from controlled feathering of the rotor blades, while flapping and lead-lag result from aerodynamic and centrifugal forces.

Pitch of the blades in the prior art is controlled by linkages to a rotating plate (swashplate) which is axially inclined and bears against a nonrotating plate whose plane is tilted by three servo actuators in response to the pilot's cyclic stick and collective stick controls.

For optimum performance it is desirable that the pitch of each blade be individually controllable as it rotates in azimuth. This has been achieved in a three-blade rotor, but not in a four-blade rotor.

Individual blade control (IBC) for helicopters has been recognized as promising improvements in performance in the presence of wind gusts, reduced vibration, and flying qualities. In one proposed implementation, the swashplate is replaced by individual blade actuators placed in the rotating system. For safety, a high degree of redundancy is required and reliable means for transmitting control signals to the rotating actuators have yet to be developed. In another proposed embodiment, inputs are transmitted through a conventional swashplate at predetermined harmonic control frequencies. However, for rotors comprised of more than three blades, certain control frequencies cannot be independently passed to each blade, thus negating many of the potential advantages of IBC.

The present invention provides a simple, mechanically reliable apparatus for achieving individual blade control without requiring development of high technical risk components. Individual blade control is introduced by providing an independently actuated differential sleeve to the normal swashplate blade control system.

BRIEF DESCRIPTION OF THE DRAWINGS

FIG. 1 is a vertical sectional view of the central portion of the rotor assembly of the helicopter taken along the line 1—1 of FIG. 2.

FIG. 2 is a vertical sectional view of the central portion of the rotor assembly taken along the line 2—2 of FIG. 1.

FIG. 3 is a schematic representation of a control system for the preferred embodiment of the invention.

SUMMARY OF THE INVENTION

The present invention is of an individual blade control system for a helicopter having a variable pitch sustaining rotor with four substantially horizontally disposed blades, comprising a vertical shaft supporting the rotor and having a pair of radially extended members flexibly coupled to opposing rotor blades. A differential sleeve is mounted for rotation about the shaft and free for displacement along a longitudinal axis thereof. The sleeve has a further pair of radially extended members orthogonal to the first pair and coupled to another pair of opposing rotor blades.

A control signal is applied to a servo actuator to raise or lower the differential sleeve. A swashplate has a first pair of arms coupled to the vertical shaft members and a second pair of opposing arms coupled to the sleeve members. The swashplate is supported by an annular member mounted to permit vertical movement on the shaft, including an oblique orientation. A triad of members extending from the support member are coupled respectively to servo actuators which respond to a control mixer coupled thereto. The servo actuators are energized by pitch control signals so that deflections of the differential sleeve and swashplate cause selective feathering of a given rotor blade to a given pitch angle at a given azimuth with respect to the longitudinal axis of the helicopter.

DESCRIPTION OF THE PREFERRED EMBODIMENT

Before discussing the structure of the invention, it is helpful to review the theory of operation of a conventional helicopter. A helicopter is maintained along a given flight path by controlling the magnitude and direction of the rotor thrust force. In a single rotor helicopter, altitude is controlled by moving the collective pitch stick to adjust the pitch angle of the rotor blades. In order to produce vertical movement of the helicopter, the collective pitch of the rotor blades is increased or decreased to cause the helicopter to ascend of descend. Translational motion in the horizontal plane is controlled by moving the cyclic stick to effectively tilt the plane of the rotor.

The lift characteristic is controlled by sinusoidally varying the lift of the propeller blades individually during each rotation of the rotor. The pitch of the blades is changes or "feathered" as each blade is rotated to a new aximuth. Each blade of an articulated type rotor is hinged in a universal manner, so that the blade is free to move up and down in a flapping motion, angular displacement in the plane of rotation, known as lead-lag, and adapted for controllable rotation in pitch about the longitudinal axis of the blade. Only the pitch is controlled, the flapping and lead-lag resulting from centrifugal and aerodynamic forces.

The cyclic pitch stick is capable of introducing longitudinal and lateral inputs to the rotor by means of a mechanical linkage between the stick and the swashplate. The swashplate tilts in response to the cyclic pitch stick input and thereby changes the pitch of each individually hinged blade through mechanical linkages, whereby the rotor follows the tilt of the swashplate. Vertical lift of the helicopter is controlled by feathering all of the blades simultaneously, thereby changing the vertical thrust component. The collective pitch stick acts to raise or lower the swashplate without imparting tilt to the rotor.

In order to augment the control forces exerted by the pilot and isolate aerodynamic influences on the control stick, boost actuators are installed between the controls and the swashplate. Further, a series actuator is normally installed between the pilots' controls and the swashplate boost actuator for stability augmentation. Such an actuator has a moveable piston output which can extend and retract in such a way as to move the swashplate without moving the pilots' controls. Series actuators can be either electromechanical or hydraulic.

Referring now to FIGS. 1 and 2 there is shown the blade pitch control mechanism for the rotor of a helicopter. The rotor here has four blades (not shown). A rotor drive shaft 10 is coupled at its lower end to a transmission and at its upper end to the rotor hub assembly.

A swashplate 12 includes a rotatable element 14 supported by an annular non-rotatable element 16 connected by bearing means 18. The swashplate arrangement is a conventional unit moveable in three degrees of freedom. The swashplate is centrally located in axial alignment with rotor drive shaft 10. Non-rotatable element 16 is tiltably supported by links 20, 22, 24 which are driven respectively by servo actuators 26, 28, and 30, equally spaced around the periphery of non-rotatable element 16. The swashplate servo actuators provide for the exact orientation of the swashplate elements 14 and 16 and may be of the type which accept electrical inputs but drive the servo actuators hydraulically.

Rotatable element 14 of swashplate 12 is equipped with four members 32, 34, 36, 38 extending at 90° intervals and coupled to corresponding drive links 40, 42, 44, 46.

A tubular sleeve 48 is adapted for axial displacement along the longitudinal axis x-x of shaft 10. Sleeve 48 is longitudinally shiftable and rotatable and is mounted at its lower portion by a bearing 50 journalling the lower end of the shaft from an annular support element 52 which is operably coupled by a member 54 and link 56 to a servo actuator 58.

Shaft 10 is equipped with a first pair of opposing radially outward projecting arms 60, 62 extending therefrom and pivotally coupled by links 64, 66, 68, 70 to the pitch horns of a first pair of corresponding opposing rotor blades 2, 4.

A second pair of radially projecting opposing arms 72, 74 extends from sleeve 48 pivotally coupled by links 76, 78, 80, 82 to the pitch horns of a second pair of corresponding rotor blades 1, 3, arms 60, 62, 72, 74 being circumferentially located on shaft 10 at 90° intervals. Sleeve 48 is further provided with vertical slots 84, 86 and through which arms 60 and 62 project which permits free axial motion of arms 60 and 62. Axial movement of swashplate 12 is thus exhibited as a change in pitch of the rotor blades coupled thereto. The axial motion is imparted by servo actuators 26, 28, 30 which provide lateral and longitudinal tilt and vertical translation to the swashplate. The rotating member 14 follows the motions of fixed ring 16 and provides cyclic and collective pitch inputs to the rotor blades for thrust magnitude and tilt control.

For the actuator configuration shown, cockpit control motions (cyclic pitch and collective pitch) are mechanically mixed in a conventional manner such that a pair of actuators operate differentially (i.e., one up and one down) in <response to longitudinal cyclic inputs, and all three actuators operate in the same direction in response to collective pitch inputs.

Differential sleeve 48 is activated independently of the cockpit controls in response to blade sensor inputs, in a manner to be described. Servo actuator 58 when energized slides sleeve 48 along shaft 10. Sliding of the sleeve 48 along shaft 10 effects a simultaneous movement of links 76, 78, 80 and 82 so that blades 1 and 3 change their pitch together by the same amount. If the swashplate is not tilted, the changed pitch will be maintained throughout the blade rotation cycle.

The pitch of each rotor blade as a function of blade azimuth angle and control inputs for a conventional rotor control system is defined by the following relationship in matrix form:

$$\begin{bmatrix} a_1 \\ a_2 \\ a_3 \\ a_4 \end{bmatrix} = \begin{bmatrix} \cos\psi & \sin\psi & 1 \\ -\sin\psi & \cos\psi & 1 \\ -\cos\psi & -\sin\psi & 1 \\ \sin\psi & -\cos\psi & 1 \end{bmatrix} * \begin{bmatrix} \theta_{lc} \\ \theta_{ls} \\ \theta_0 \end{bmatrix}$$

where:
- $a_1$ = blade 1 pitch
- $a_2$ = blade 2 pitch
- $a_3$ = blade 4 pitch
- $a_4$ = blade 4 pitch
- $\psi$ = blade 1 azimuth angle
- $\theta_{lc}$ = lateral cyclic input
- $\theta_{ls}$ = longitudinal cyclic input
- $\theta_0$ = collective pitch input By means of the above matrix, cyclic and collective pitch commands (independent variables) are converted from the fixed reference frame to the rotating frame blade pitch commands (dependent variables).

The above relationship may be alternately written as four simultaneous equations:

$$a_1 = \theta_{lc} \cos\psi + \theta_{ls} \sin\psi + \theta_0$$

$$a_2 = \theta_{lc} \sin\psi + \theta_{ls} \cos\psi + \theta_0$$

$$a_3 = \theta_{lc} \cos\psi - \theta_{ls} \sin\psi + \theta_0$$

$$a_4 = \theta_{lc} \sin\psi - \theta_{ls} \cos\psi + \theta_0$$

For the present invention the matrix defining the pitch of each blade follows:

$$\begin{bmatrix} a_1 \\ a_2 \\ a_3 \\ a_4 \end{bmatrix} = \begin{bmatrix} \cos\psi & \sin\psi & 1 & 1 \\ -\sin\psi & \cos\psi & 1 & 0 \\ -\cos\psi & -\sin\psi & 1 & 1 \\ \sin\psi & -\cos\psi & 1 & 0 \end{bmatrix} * \begin{bmatrix} \theta_{lc} \\ \theta_{ls} \\ \theta_0 \\ \theta_d \end{bmatrix}$$

where $\theta_d$ = differential sleeve input

To achieve any desired combination of blade angles at a specific azimuth, the above matrix may be rewritten to solve for the required control inputs by the matrix inversion process:

$$\begin{bmatrix} \theta_{lc} \\ \theta_{ls} \\ \theta_0 \\ \theta_d \end{bmatrix} = \frac{1}{2} \begin{bmatrix} \cos\psi & -\sin\psi & -\cos\psi & \sin\psi \\ \sin\psi & \cos\psi & -\cos\psi & -\cos\psi \\ 0 & 1 & 0 & 1 \\ 1 & -1 & 1 & -1 \end{bmatrix} * \begin{bmatrix} a_{1d} \\ a_{2d} \\ a_{3d} \\ a_{4d} \end{bmatrix}$$

where $a_{ld}$ = desired pitch angle of blade 1, etc.

This matrix when expanded yields the following equations:

$$\theta_{lc} = \tfrac{1}{2}[a_1 \cos\psi - a_2 \sin\psi - a_3 \cos\psi + a_4 \sin\psi]$$

$$\theta_{ls} = \tfrac{1}{2}[a_1 \sin\psi + a_2 \cos\psi - a_3 \sin\psi - a_1 \sin\psi]$$

$$\theta_0 = 0 + \tfrac{1}{4}a_2 + 0 + \tfrac{1}{4}a_4$$

$$\theta_d = \tfrac{1}{4}[a_1 - a_2 + a_3 - a_4]$$

Observe that in the above equations, $a_1$, $a_2$, $a_3$, and $a_4$ are the independent variables, and $\theta_{lc}$, $\theta_{ls}$, $\theta_0$, and $\theta_d$ are the dependent variables. This means that a unique solution exists for the cyclic, collective and differential inputs required to effect any desired single or multiple blade angle condition.

Referring now to FIG. 3 a block diagram is shown of the complete blade control system, showing how individual blade control is introduced into the rotor. The cyclic stick and collective pitch controls provide lateral, longitudinal and collective inputs to combiners 102, 104, 106, respectively. Input signals from the aircraft sensors provide stabilization signals which are processed for frequency response and gain in accordance with conventional stabilization control law 108, by control computer 110, which may be a digital or analog computer. Limited authority actuators 114, 116, 118 are placed in series with the inputs from the cockpit controls by combiners 102, 104 and 106 in a manner identical to current practice for aircraft stabilization purposes, except that the actuators must be compatible with the bandwidth required for IBC feedback. This requires a bandwidth of the order of 50 Hz, as compared to 10 Hz for prior art systems. An additional limited authority actuator 112 is used to drive differential sleeve 48, although no pilot initiated inputs are present in this path.

The control mixer 100 outputs are coupled to servo actuators 26, 28, 30 which drive swashplate 12. Summing linkages 124 and 126 have their pivot points attached to the differential sleeve 48, swashplate 12, and blades 1 and 3, while blades 2 and 4 are directly linked to swashplate 12. Thus, vertical movement of sleeve 48 applies a pitch change to blades 1 and 3 but does not effect blades 2 and 4. In addition to sensor stabilization inputs control computer 110 also accepts IBC sensor inputs. These inputs are processed in accordance with IBC control laws 120. The IBC sensor data is typically representative of individual blade motions and may be responsive to dynamic states of the rotor blades, such as flapping angle, acceleration, etc. The computer 110 computes the desired blade pitch angles based on control laws compatible with the IBC objectives. Various computational techniques are discussed in current technical literature, such as "The Measurement and Control of Helicopter Blade Modal Response using Blade-Mounted Accelerometers," Norman D. Ham, et al, Thirteenth European Rotorcraft Forum, paper no. 6-10, Sept. 8-11, 1987, MIT, and references 1-14 cited therein. These computed IBC blade angle commands are converted to actuator commands by the previously described coordinate transformation matrix, and are superimposed on the conventional lateral, longitudinal, and collective stabilization commands.

In operation, when swashplate 12 translates longitudinally with respect to axis x—x, it causes blades 1, 2, 3, 4 to change pitch simultaneously in collective pitch action. When differential sleeve 48 translates with respect to axis x—x blades 1 and 3 will change pitch simultaneously, in addition to the pitch change induced by swashplate 12. When swashplate 12 pivots about any horizontal axis passing through axis x—x, it causes cyclic pitch variations to blades 1, 2, 3, 4. These variations are also coupled to any pitch changes induced by motion of differential sleeve 48. Control mixer 100 is connected via swashplate boost actuators 26, 28, 30 to swashplate 12 and serves the function of establishing a horizontal translation axis or a horizontal axis about which swashplate 12 will be caused to tilt by lateral and longitudinal cyclic inputs and collective inputs from the pilots' cockpit controls and control computer 110. The selection of the horizontal axis about which the swashplate member 14 tilts determines the rotor azimuth at which blade pitch change takes place as a result of cyclic stick inputs. Control computer 110 receives the IBC sensor inputs, processes them in accordance with the IBC control laws and the transformation matrix described above and provides input to the differential sleeve 48 and control mixer 100, in combination with processed stabilization sensor inputs.

It may be seen that the present invention provides significant performance improvements over other proposed implementations of IBC. The actuators are installed in a non-rotating environment and can be limited authority and thus failure tolerant. The primary controls remain conventional hydro-mechanical and thus represent no departure from well-established design practices, and no new flight safety concerns are introduced. Motions from the actuators are summed mechanically with cockpit control motions and transmitted to the rotor blades through a conventional swashplate and a unique differential summing linkage. Computed individual blade commands are applied to a coordinate transformation matrix to derive cyclic, collective, and differential blade pitch commands.

While the invention has been described in its preferred embodiments, it is to be understood that the words which have been used are words of description rather than limitation and that changes may be made within the purview of the appended claims without departing from the true scope and spirit of the invention in its broader aspects.

Embodiments of an invention in which an exclusive property or right is claimed are defined as follows:

1. An individual blade control system for a helicopter having a variable pitch sustaining rotor with at least four substantially horizontally disposed blades, comprising:
   a substantially vertical shaft supporting said rotor and having first and second radially extended members flexibly coupled to opposing first and second ones of said rotor blades, respectively,
   differential sleeve means slideably mounted for rotation and axial displacement with respect to a longitudinal axis of said vertical shaft and having third and fourth radially extended members flexibly coupled to opposing third and fourth ones of said rotor blades, respectively, and orthogonal to said first and second radially extended members,
   servo actuator means, responsive to a first control signal, and operably coupled to raise or lower said differential sleeve with respect to said vertical shaft,
   swashplate means, mounted for rotation about said vertical shaft and having a first pair of radially extended members flexibly coupled to corresponding ones of said first and second members of said vertical shaft and a second pair of radially extended members flexibly coupled to corresponding ones of said third and fourth differential sleeve members,
   swashplate support means in the form of an annular member slideably engaging said swashplate means and mounted for axial displacement along said shaft, said support means adapted for oblique displacement with respect to said longitudinal axis of said shaft, and having a plurality of radially extended members operably coupled to ones of a corresponding plurality of further servo actuator means, said plurality of further servo actuator means responsive to control mixer means, means for applying a first control signal in accordance with a predetermined pitch control law to said servo actuator means, and means for applying second control signals in accordance with said predetermined pitch control law to said plurality of further servo actuator means, whereby ones of said rotor blades are selectively feathered to a predetermined pitch angle at a predetermined azimuth with respect to the heading of said helicopter in accordance with deflections of said differential sleeve means and said swashplate.

2. A blade control system as set forth in claim 1, further comprising means for generating said first control signal, comprising:

means for providing a signal corresponding to a pitch attitude of one of said rotor blades, and computer means responsive to said pitch attitude signal for deriving a desired pitch angle of said one of said rotor blades and for deriving a desired displacement of said differential sleeve means corresponding to said desired pitch angle in accordance with said predetermined pitch control law.

3. A blade control system as set forth in claim 2, further comprising means for providing a signal corresponding to at least one dynamic state of said one of said rotor blades and means for applying said signal to said computer means for varying the displacement of said differential sleeve means in accordance therewith.

4. A blade control system as set forth in claim 3, further comprising means for generating said second control signal, comprising:

means for providing lateral cyclic, longitudinal cyclic, and collective pitch cockpit control signals, means for providing lateral cyclic, longitudinal cyclic, and collective pitch stabilization signals, means for providing rotor pitch attitude signals, and means for combining said stabilization signals said rotor pitch attitude signals and said cockpit control signals, said computer means further responsive to said pitch attitude signals for deriving pitch angle correction signals in accordance with said predetermined pitch control law.

5. A blade control system as set forth in claim 4, said means for generating said second control signal further comprising:

computer means responsive to said desired pitch angle of said one of said rotor blades for deriving required lateral cyclic, longitudinal cyclic, and collective pitch signals corresponding to said desired pitch angle in accordance with said predetermined control law, said computer means further responsive to said stabilization signals for combining said stabilization signals with said derived lateral cyclic, longitudinal cyclic, and collective pitch signals.

6. A blade control system as set forth in claim 5, wherein said predetermined control law comprises means for deriving the required lateral cyclic, longitudinal cyclic, collective pitch, and differential sleeve displacement signals corresponding to said desired blade pitch angle as a function of blade azimuth angle according to the transformation matrix:

$$\begin{bmatrix} \theta_{lc} \\ \theta_{ls} \\ \theta_0 \\ \theta_d \end{bmatrix} = \tfrac{1}{2} * \begin{bmatrix} \cos\psi & -\sin\psi & -\cos\psi & \sin\psi \\ \sin\psi & \cos\psi & -\cos\psi & -\cos\psi \\ 0 & 1 & 0 & 1 \\ 1 & -1 & 1 & -1 \end{bmatrix} * \begin{bmatrix} a_{1d} \\ a_{2d} \\ a_{3d} \\ a_{4d} \end{bmatrix}$$

where:
$\psi$ = blade 1 azimuth angle
$\theta_{lc}$ = lateral cyclic input
$\theta_{ls}$ = longitudinal cyclic input
$\theta_0$ = collective pitch input
$\theta_d$ = differential sleeve input
$a_{1d}$ = blade 1 desired pitch angle
$a_{2d}$ = blade 2 desired pitch angle
$a_{3d}$ = blade 3 desired pitch angle
$a_{4d}$ = blade 4 desired pitch angle 7. A blade control system as set forth in claim 6, further comprising control mixer means, said mixer means comprising:

means for differentially activating first and second ones of said plurality of servo actuators in response to said lateral cyclic pitch control and stabilization signals, means for activating a third one of said plurality of servo actuators in response to said collective pitch signal, and means responsive to said collective pitch signal for activating said first, second and third actuators.

8. A blade control system as set forth in claim 7, further comprising:

means for providing a signal corresponding to a displacement of one of said rotor blades in accordance with an applied wind gust to said computer means, means for applying said control law means to said computer means to derive a desired pitch of said displaced rotor blade as a function of azimuth angle, and means responsive to said computer means for deriving corresponding lateral cyclic, longitudinal cyclic, collective pitch, and differential displacement signals.

9. A blade control system as set forth in claim 8, further comprising a plurality of limited authority actuator means responsive respectively to derived lateral cyclic, longitudinal cyclic or collective pitch signals for applying fractional deviations to said rotor cyclic control signal, said longitudinal cyclic control signal, and said collective pitch control signal.

10. A blade control system as set forth in claim 9, further comprising a further limited authority actuator means responsive to said differential displacement signal for applying fractional deviations to said differential sleeve means.

11. A blade control system as set forth in claim 10, wherein said pitch angle correction signals are serially connected with said plurality of limited authority actuator means and said control mixer means.

12. A blade control system as set forth in claim 11, wherein said pitch angle correction signals are differentially applied to said cockpit control signals.

13. A blade control system as set forth in claim 12, wherein said differentially applied signals are mechanically coupled by said control mixer means to said plurality of servo actuator means.

* * * * *

UNITED STATES PATENT AND TRADEMARK OFFICE
CERTIFICATE OF CORRECTION

PATENT NO.   :   4,930,988

DATED        :   Jun. 5, 1990

INVENTOR(S)  :   Carl D. Griffith

It is certified that error appears in the above-identified patent and that said Letters Patent is hereby corrected as shown below:

On the title page, insert the following assignee data:

--Assignee: Honeywell Inc.,
            Minneapolis, Minn.--.

Signed and Sealed this

Twentieth Day of August, 1991

Attest:

HARRY F. MANBECK, JR.

*Attesting Officer*     *Commissioner of Patents and Trademarks*